United States Patent [19]

Cummings

[11] Patent Number: 5,014,735
[45] Date of Patent: May 14, 1991

[54] AUTOMATIC DRAIN VALVE

[75] Inventor: Ernie W. Cummings, Louisville, Tenn.

[73] Assignee: Drain-All, Inc., Louisville, Tenn.

[21] Appl. No.: 517,809

[22] Filed: May 2, 1990

[51] Int. Cl.[5] ............................................. F16K 31/34
[52] U.S. Cl. ..................................... 137/195; 137/413
[58] Field of Search ............... 137/195, 413, 414, 432, 137/433; 251/65

[56] References Cited

U.S. PATENT DOCUMENTS

| | | | |
|---|---|---|---|
| 1,002,252 | 9/1911 | Fitts | 137/432 X |
| 2,189,427 | 2/1940 | Long | 137/432 |
| 4,444,217 | 4/1984 | Cummings | 137/195 |
| 4,562,855 | 1/1986 | Cummings | 137/195 |
| 4,574,829 | 3/1986 | Cummings | 137/195 |
| 4,779,640 | 10/1988 | Cummings | 137/195 |

*Primary Examiner*—Alan Cohan
*Attorney, Agent, or Firm*—Pitts and Brittian

[57] ABSTRACT

An automatic drain valve for discharging accumulations of condensables and foreign materials from a pneumatic system. The drain valve (10) comprises a reservoir (14) defining an inlet (30) and an outlet (86) for flowthrough communications with a pneumatic system. A pilot valve (41) is mounted in the reservoir (14) for selectively communicating pressurized air to a valve operator (57), such that the valve operator selectively opens and closes a drainage valve (82) communicating with the outlet (88) of the reservoir (14) for selective draining the reservoir. The pilot valve (41) includes a sensor tube (42) which defines a valve seat (44) and includes a magnetized valve plug (46) for selectively engaging the valve seat (44), the valve plug (46) having a selected magnetic polarity. A level sensing float (52) disposed within the reservoir (15) carries an annular magnet (56) normally having a polarity opposite that of the valve plug (46) such that the annular magnet (56) acts upon the valve plug (46) selectively opening and closing the pilot valve (81) as the float (52) rises and falls from a raised position to a lower position with the level of liquid within the reservoir (14).

5 Claims, 4 Drawing Sheets

AUTOMATIC DRAIN VALVE

DESCRIPTION

This application in part discloses and claims subject matter disclosed in my earlier filed pending application, Ser. No. 07/503,721 filed on Apr. 3, 1990.

1. Technical Field

This invention relates to an automatic drain valve for discharging accumulations of condensables and foreign materials from various pneumatic systems and/or devices.

2. Background Art

In various pneumatic systems and devices it is necessary to remove condensates and other foreign materials to insure proper operation. Various devices such as separators, filter traps, dryers, drip-legs, etc., are used for separating out and collecting condensates and other materials, and such devices are generally provided with drain valves for discharging the collected condensables from the pneumatic system or device. Many different drain valves have been devised for discharging the accumulated materials from pneumatic systems. For example, some drain valves are regulated by timers to automatically open the valve to collected. Other drain valves open in response to a certain amount of condensates or other material being collected. One such drain valve system is disclosed in U.S. Pat. No. 4,779,640 issued to Ernie W. Cummings and Ralph W. Farkas. Another drain valve system is disclosed in U.S. Pat. No. 4,574,829 issued to Ernie W. Cummings and Nick Valk such patent being a continuation-in-part of U.S. Pat. No. 4,444,217, issued Apr. 24, 1984, there being a previously filed continuation-in-part application resulting in U.S. Pat. No. 4,562,855, issued Jan. 7, 1986. The drain valve systems of U.S. Pat. Nos. 4,779,640 and 4,574,829 comprise a reservoir for receiving condensates and other material from the pneumatic system. The reservoir of the drain valve is selectively drained by a valve connected to the outlet port of the drain valve's reservoir. In order to open and close the drain valve of the system, a pneumatic valve operator is required, the valve operator being actuated by pressurized air selectively communicated to the valve operator by a magnetically controlled pilot valve. Still other of these known systems and devices for draining pneumatic systems are described in the background section of the above-identified patents and otherwise cited in such patents. Further, various drain valves marketed by Van Air Systems, Inc., Lake City, Pa., and Pa., and Hankison Corporation, Canonsburg, Pa., are illustrative of prior art devices.

Therefore, it is an object of the present invention to provide an automatic drain valve for discharging accumulations of condensables and foreign materials present in pneumatic systems.

Another object of the present invention is to provide a drain valve which discharges condensates and other materials without expelling air or other gasses from the associated pneumatic system.

A further object of the present invention is to provide an automatic drain valve which is self flushing so as to be essentially self cleaning.

Yet another object of the present invention is to provide an automatic drain valve which is suitable for use with high pressure pneumatic systems.

Still another object of the present invention is to provide an automatic drain valve which is inexpensive to manufacture and maintain, particularly by virtue of its size.

DISCLOSURE OF THE INVENTION

Other objects and advantages will be accomplished by the present invention which provides an automatic drain valve for discharging accumulations of condensables and drain valve comprises a reservoir defining a reservoir volume for collecting condensables and foreign materials. The reservoir includes a head portion and a base portion, with the base portion being provided with a first passageway defining an inlet for being placed in fluid communication with the pneumatic system. The first passageway also defines a mouth opening into the reservoir volume through which condensables and foreign materials flow into the reservoir volume. The reservoir further includes a draining conduit defining an outlet whereby the first passageway and drainage conduit provide flow-through communications with the pneumatic system.

The drain valve further comprises a pilot valve housing mounted within the reservoir volume which defines a cavity sealed against communication with the reservoir volume, the cavity being in fluid communication with a source of pressurized air or gas. A pilot valve is mounted within the cavity of the pilot valve housing, the pilot valve including a sensor tube defining a valve seat and including a magnetic valve plug for engaging the valve seat, such valve plug having a selective magnetic polarity. A buoyant float is also disposed within the reservoir volume. The float is provided with a hole for slidably receiving the pilot valve housing and is movable within the reservoir volume from a lower position to an upper position. Mounted in the float proximate the valve housing is an annular magnet normally having a polarity opposite the polarity of the magnetic valve plug, such that when the float is in the lowest position or is rising within the reservoir, the annular magnet and the magnetic valve plug oppose each other causing the valve plug to close against the valve seat. When the float reaches its uppermost position, the relative polarity of one of the magnets is effectively reversed causing the valve plug to move away from the valve seat and pressurized air to be communicated to a pneumatic valve operator. In one preferred embodiment the float defines upper and lower convexed surfaces to better withstand high pressures within the reservoir volume.

Also provided is a drainage valve communicating with the reservoir outlet for selectively draining the reservoir volume, with linkage means being provided for connecting the pneumatic valve operator to the drainage valve such that the valve operator selectively opens and closes the drainage valve.

BRIEF DESCRIPTION OF THE DRAWINGS

The above-mentioned features of the present invention will become more clearly understood from the following detailed description of the invention read together with the drawings in which.

BEST MODE FOR CARRYING OUT THE INVENTION

Figure 1:
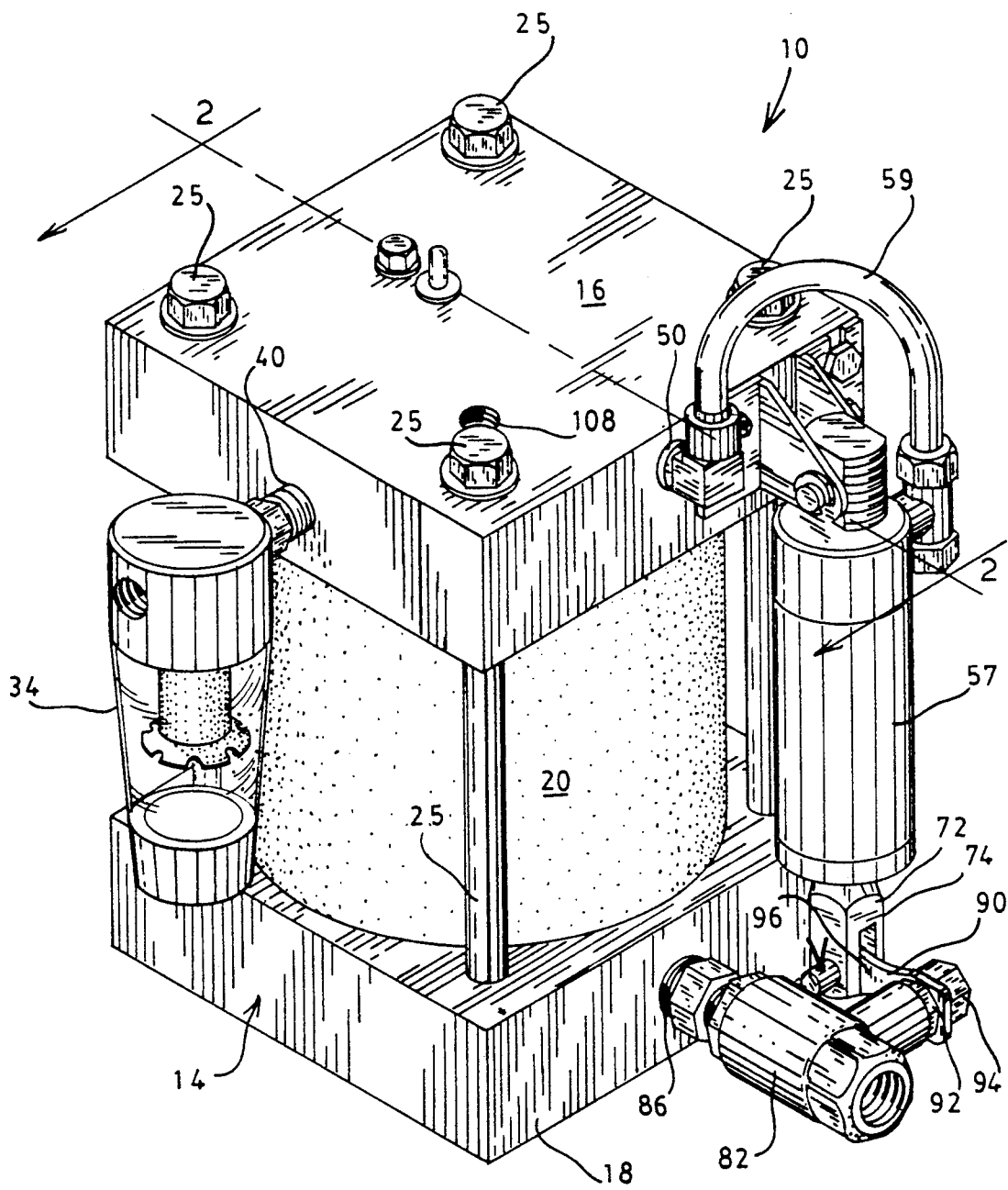
FIG. 1 illustrates a perspective view of an automatic drain valve of the present invention.

An automatic drain valve incorporating various features of the present invention is illustrated generally at 10 in the Figures. The drain valve 10 is utilized to automatically drain accumulations of condensables and foreign materials present in a pneumatic system. The valve 10 comprises a reservoir 14 defining a reservoir volume 15 (see FIG. 2) for receiving such condensables and foreign materials. More specifically, the reservoir 14 includes a head portion 16 and a sleeve 20 which extends between the head portion 16 and the base portion 18 so as to form the walls of the reservoir 14. Preferably the sleeve 20 is fabricated of a transparent, or translucent, material such that the condensate level within the reservoir 14 can be viewed from outside of the valve 10.

Figure 2:
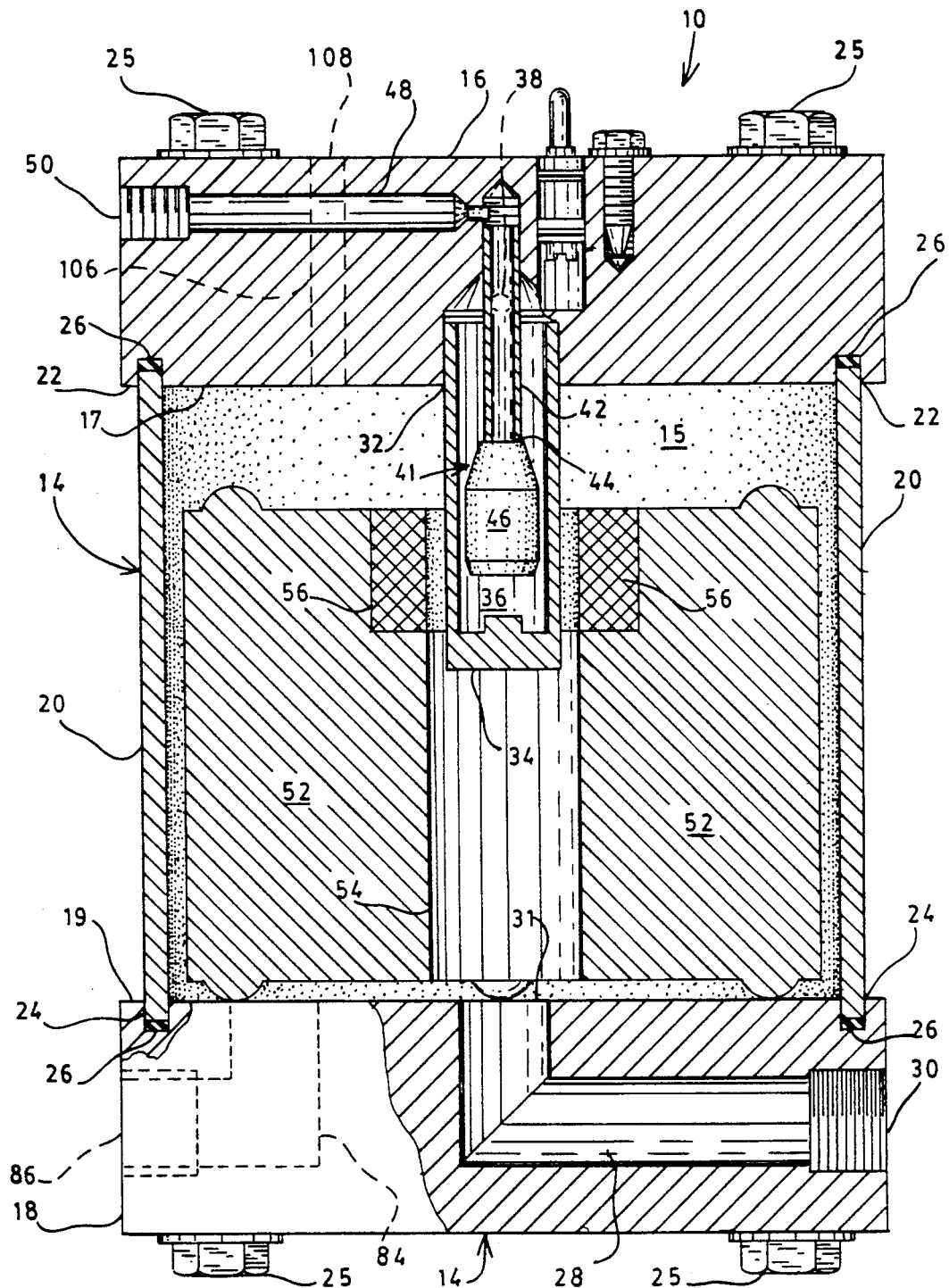
FIG. 2 illustrates a side elevation view, in section, of an automatic drain valve of the present invention.

As illustrated in FIG. 2, in order to facilitate the securing of the sleeve 20 between the head portion 16 and the base portion 18, the lower surface 17 of the head portion 16 and the upper surface 19 of the base portion 18 are provided with annular grooves 22 and 24, respectively, for receiving the opposite ends of the sleeve 20. Further, suitable annular seals 26 are positioned in the grooves 22 and 24 to insure the fluid impervious integrity of the reservoir 14. Of course, suitable securing or clamping means such as the fasteners 25 are provided for securing the sleeve 20 in position between the head portion 16 and the base portion 18.

Figure 3A:
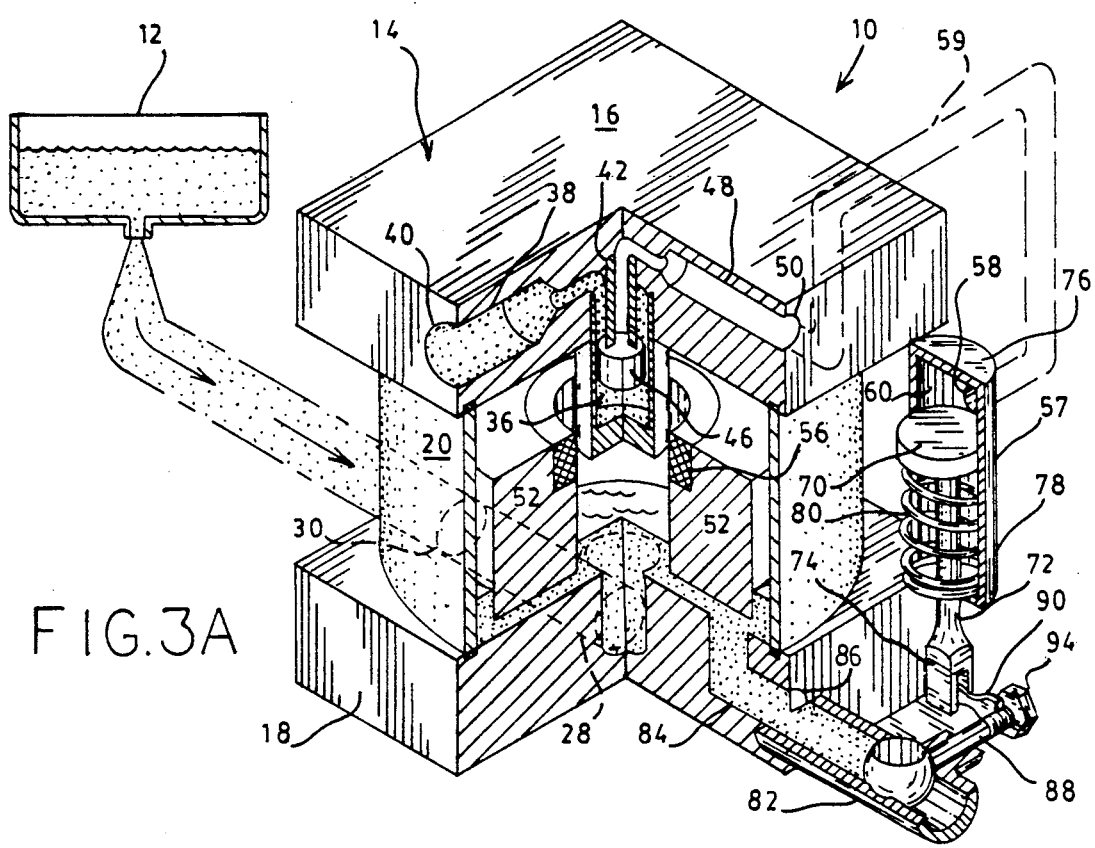
FIG. 3A diagrammatically illustrates a perspective view, partially in section, of an automatic drain valve of the present invention.
Figure 3B:
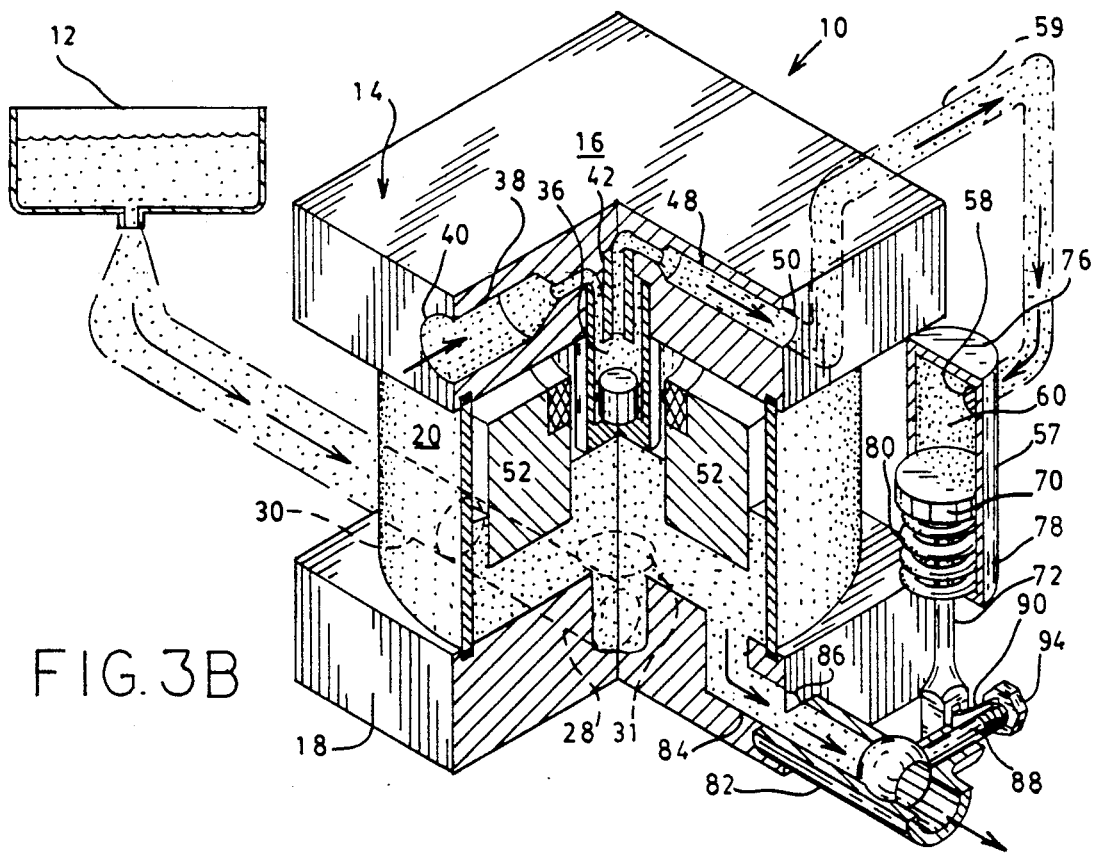
FIG. 3B diagrammatically illustrates a perspective view, partially in section, of an automatic drain valve of the present invention.

As illustrated in FIGS. 2, 3A and 3B, the base portion 18 is provided with a first passageway 28 defining an inlet 30 for connection to a collecting or separating apparatus of pneumatic or other gas system such as a coalescing filter 12. The first passageway 28 communicates with the reservoir volume 15 such that condensables and foreign materials from, for example, the coalescing filter 12 of a pneumatic system can be communicated through the inlet 30 and into the reservoir volume 15. By directing the condensates and other materials into the volume 15 through the base portion 18, a stirring action is produced as condensates and other materials enter, breaking up the oil film generally floating on the surface of the condensates within the reservoir and otherwise mixing the substances collected. This mixing effect facilitates the flushing of the reservoir, making the valve 10 essentially self cleaning. The head portion 16 is also provided, on its lower surface 17, with a hole 32 which is closely receptive of a cylindrical pilot valve housing 34, such that the pilot valve housing 34 depends from the head portion 16, extending downwardly into the reservoir volume 15. The pilot valve housing 34 defines a cavity 36 and the head portion 16 is provided with a second passageway 38 communicating therewith, the second passageway 38 defining a second inlet 40 for connection to a suitable source of filtered pressurized air or other gas. Normally the pneumatic system on which the drain valve 10 is installed is used as the source of pressurized air, with a filter 39 being provided between the pneumatic system and the inlet 40 to insure that contaminants from the system do not enter the cavity 36. It will be noted that the cavity 36 is sealed against communication with the reservoir volume 15 such that condensates and other material do not enter the cavity 36.

The drain valve 10 further comprises a pilot valve 41 mounted axially within the cavity 36 of the pilot valve housing 34. The pilot valve 41 includes a sensor tube 42 defining a valve seat 44 at its lower end, the sensor tube 42 being mounted within the hole 32 of the head portion 16 and disposed so as to extend axially down into the cavity 36. The pilot 41 further includes an axially moving magnetic valve plug 46 disposed in the cavity 36 for selectively engaging the valve seat 44 and closing the sensor tube 42, as will be discussed in detail below. Communicating with the upper end portion of the sensor tube 42 is a third passageway 48 defining an outlet 50 through which pressurized gas supplied to the cavity 36 selectively exits the head portion 16 when the plug 46 is not seated against the valve seat 44.

Disposed within the reservoir volume 15 is a buoyant member or float 52 defining an axial hole 54 slidably receptive of the pilot valve housing 34, such that the float 52 is movable within the volume 15 from a lower position wherein the bottom of the float 52 is in contact with, or proximate to, the upper surface 19 of the base portion 18 (see FIG. 3A) to a raised position wherein the top of the float 52 is in contact with, or proximate to, the under surface 17 of the head portion 16 (see FIG. 3B).

Mounted in the annular walls of the hole 54 of the float 52, proximate the top portion thereof, is an annular magnet 56 which encircles the pilot valve housing 34 and serves as an actuator to move the magnetic valve plug 46 in and out of contact with the valve seat 44 in order to operate the pilot valve 41. In this regard, the polarity of the magnet 56 and the magnetic valve plug 46 is chosen such that when the float is in the lower position or is rising within the reservoir, the magnet 56 and the magnetic plug 46 oppose each other causing the plug 46 to close against the valve seat 44. (see FIG. 3A) Resultantly, the pressurized gas entering through the second passageway 38 is not allowed to escape the cavity 36 through the third passageway 48. However, when condensates and other materials entering through the first passageway 28 fill the volume 15 to a level sufficient to elevate the float 52 to the upper position, thereby altering the relative position of the magnet 56 and the plug 46 such that they are substantially aligned in height, the magnetic field generated within the magnet 56 causes an effective reversal in the polarity of the magnetic field within the magnetic plug 46. This effective reversal is not instantaneous due to the hysteresis of the magnetic plug 46. When polarity of the magnetic field is reversed, the plug 46 is repelled by the magnet 56, and, as a result, moves downwardly in the cavity 36 and away from the valve seat 44. Accordingly, pressurized gas is received through the sensor tube 42 and through the third passageway to exit to outlet 50. It should be noted that in order to insure that the plug 46 properly seals the sensor tube 42 when the pilot valve is closed, the plug 46, or at least the upper portion thereof, can be covered with a rubber material or other suitable sealant material. One suitable covering material is Buna "N" Hi Nitrile which provides the desired sealing effect and provides an outer surface which resists the accumulation of liquids and other materials which might affect the proper operation of the valve.

As indicated above, when the pilot valve 41 is opened in response to condensates and other materials rising to a preselected level in the volume 15, pressurized gas exits the outlet 50 of the head portion 16. The outlet 50 is connected in fluid communication with a pneumatic valve operator 57 mounted on the exterior of the reservoir 14. More specifically, the outlet 50 is connected, as with the tube 59, to an inlet port 58 provided in the first end portion 76 of the cylinder of the valve operator 57, so as to communicate with the piston cavity 60 of the valve operator 57. A piston member 70, carrying an actuator arm 72, is slidably mounted within the cavity 60, the actuator arm 72 being slidably received through the hole provided in the second end portion 78 of the cylinder such that the outboard end portion 74 of the arm 72 is external to the cylinder of the valve operator 57.

The piston member 70 is capable of reciprocal movement between the first end portion 76 of the cylinder and the second end portion 78 thereof. Moreover, the piston member 70 is biased toward the first end portion 76 of the cylinder by a spring member 80. Thus, in the absence of pressurized air being injected into the cavity 60 via the inlet port 58, the piston member 70 is maintained in the position illustrated in FIG. 3A. But, when the pilot valve opens and pressurized gas is injected into the cavity 60 overcoming the bias of the spring member 80, the piston member 70 travels toward the second end portion 78 of the cylinder and assumes the position illustrated in FIG. 3B with the actuator arm 72 assuming a fully extended position.

The reciprocal movement of the actuator arm 72 is utilized to selectively open and close a drainage valve 82, the drainage valve 82 serving to selectively drain condensates and other materials from the volume 15. In this regard, the base portion 18 is provided with a drainage conduit 84 communicating with the volume 15 and which defines an outlet 86. The drainage valve 82 communicates with the outlet 86 so as to selectively allow condensates and other material to drain from the volume 15 via the drainage conduit 84 and is opened and closed by selective rotation of the drain valve actuator 88 of the drainage valve 82. In this regard, a linkage member 90 is provided for operatively connecting the actuator arm 72 of the valve operator 57 to the actuator 88. The first end portion 92 of the linkage member 90 is secured to the actuator with a suitable fastener such as the illustrated nut 94 which is received on the threaded stem of the actuator 88. Further, the second end portion 96 of the linkage member 90 is pivotally secured to the outboard end 74 of the actuator arm 72. Resultantly, reciprocation of the actuator arm 72 serves to pivot or rotate the drain valve actuator 88, moving the actuator 88 from a closed valve position, when the actuator arm 72 is retracted, (see FIG. 3A) to an open valve position, when the actuator arm 72 is extended (see FIG. 3B).

With respect to the securing of the linkage member 90 to the valve actuator 88 the orientation of the threading on the threaded stem and the nut 94 should be such that the rotational direction for tightening the nut 94 corresponds to the rotational direction of the linkage member 90 as the actuator arm 72 is moving from a retracted position to an extended position. In this regard, it has been found that the force with which the actuator arm 72 pivots the linkage member 90 when pressurized air is injected into the valve operator 57 tends to loosen the nut 94 if the rotational direction necessary to tighten the nut 94 does not correspond to the rotational direction of the linkage member 90 as the actuator arm 72 is extended.

Thus, it will be understood that when the level of condensates and other materials within the volume 15 rises to a preselected level, raising the float 52, the interaction of the magnetic valve plug 46 and the magnet 56 as described above opens the pilot valve 41 allowing pressurized air to be communicated to the inlet 58. This injection of pressurized air forces the piston member 70 toward the second end portion 78 of the valve operator 57 thereby moving the actuator arm 72 to the fully extended position so as to open the drainage valve 82, allowing the volume 15 to drain. Of course, as the condensates and other materials drain from the volume 15 the float 52 drops within the volume 15 until magnet polarity reversal occurs and the plug 46 seats against the valve seat 44, cutting off pressurized air to the piston cavity 60. As a result, the spring member 80 biases the piston member 70 back to its raised position carrying the actuator arm to its retracted position and closing the drainage valve 82. It will be recognized that the magnetic polarity reversal occurs at the top and bottom extremes of travel of the float 52 due to the delay imparted by the magnetic hysteresis during reversal. Resultantly, the pilot valve, and thus the drainage valve 82, operates in a "snap on" and "snap off" manner, insuring that the reservoir volume 15 does not over fill or drain prior to being substantially filled.

As best illustrated in FIG. 2, the head portion 16 of the reservoir 14 is provided with a further conduit 106 communicating with the reservoir volume 15, the conduit 106 defining an inlet 108 for communicating with a source of pressurized air or gas. Generally this source of pressurized air is the balance line of the pneumatic system on which the drain valve 10 is installed such that the air pressure above the condensates within the volume 15 is substantially equal or slightly less than the pressure within associated pneumatic system. Given the pressurization of the volume 15 through 106, when the drainage valve 82 snaps to the open position most of the condensates within the volume 15 are quickly flushed from the drain valve 10. However, as illustrated in FIG. 3A, when the float 52 reaches the bottom extreme of travel, and the valve 82 snaps to an off position, a preselected amount of condensate remains in the reservoir volume 15 to maintain a liquid barrier or seal between the pressurized air within the volume 15 and the outlet 86. It will be understood that if the drain valve 10 was allowed to fully drain, as is the case with various prior art drain valves, a loss of compressed air from the pneumatic system would occur through the outlet port 86 and valve 82. Further, many prior art drain valves generate a great deal of noise when activated, mainly due to the discharge of compressed air which follows the flushing of the condensates. However, the drain valve 10, by not fully flushing the reservoir 14 avoids the noise of the expulsion of compressed air, and the associated cost and inefficiency of lost compressed air.

It should also be noted that in the preferred embodiment the drainage valve 82 comprises a ball valve rather than a poppet valve as is utilized by certain conventional drain valves. In this regard, in such prior art drain valves foreign matter tends to build up on poppet valve surfaces and the associated valve seat prohibiting the valve from properly closing and making frequent cleaning a necessity. However, the ball valve of the present invention shears off dirt and foreign matter from valve surfaces during operation making the valve 82 essentially self cleaning, with the self cleaning ability of the valve being enhanced by the forceful "snap on" and "snap off" operation of the valve operator and valve 82. It will also be recognized that the spring 80 biases the valve 82 to a closed position such that should the drain valve 10 fail for any reason the drainage valve 82 will remain in a closed position, unlike many prior art valves which frequently fail in an open position resulting in loss of compressed air and/or air pressure within the associated pneumatic system.

Further, it will be recognized that by locating the first passageway 28 which communicates condensables and foreign matter to the volume 15 in the base portion 18 rather than the head portion 16 condensates and other materials entering the volume 15 create a stirring action which breaks up oil film and otherwise mixes the substances collected to facilitate the flushing of the volume 15. Moreover, the mouth 31 of the passageway 28 is positioned so as to be below and, preferably, substantially coaxial with, the hole 54 of the float 52 such that the float 52 does not obstruct the flow of condensates into the volume 15 and so as to avoid a build up of foreign matter beneath the float which might impair operation of the drain valve 10.

Figure 4:
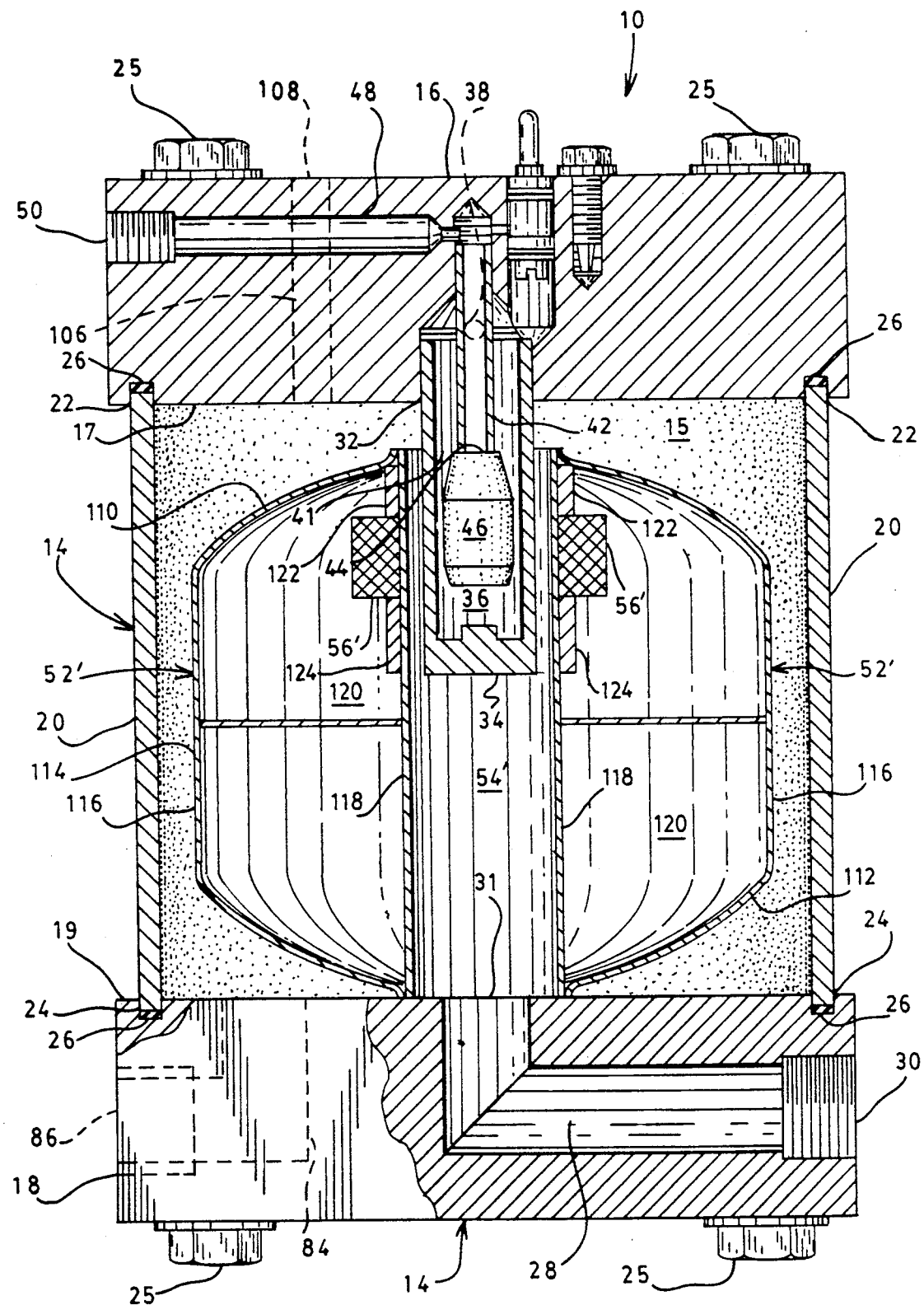
FIG. 4 illustrates a side elevation view of an automatic drain valve of the present invention depicting an alternate float embodiment.

In FIG. 4 the drain valve 10 is illustrated with an alternate float, illustrated at 52', for use with high pressure pneumatic systems. In this regard, where the drain valve is used to discharge accumulations of condensables and foreign materials from pneumatic systems which generate high pressures, e.g. in excess of 250 psi, the float configuration illustrated in FIGS. 1-3B is generally inappropriate due to the tendency of the float to be crushed by the air pressure communicated to the volume 15 from the pneumatic system. As illustrated, the float 52' defines a convexed upper surface 110 and a convexed lower surface 112, with a vertical sidewall surface 114 extending therebetween. More specifically, in the preferred embodiment the float includes an outer shell 116 which defines the surfaces 110, 112 and 114, and an inner sleeve 118 which defines the hole 54' which extends through the float 52'. The sleeve 118 engages the shell 116 at or proximate its opposite ends such that the shell 116 and the sleeve 118 define a fluid impervious volume 120 which produces the necessary buoyancy.

As with the float embodiment 52, the float 52' is provided with a magnet 56' for actuating the plug 46. The magnet 56' circumscribes the sleeve 118 and is held in position by suitable retaining means such as the retaining collars 122 and 124.

Preferably the shell 116 and sleeve 118 are fabricated of stainless steel or other strong, durable metal so as to withstand the pressure within the volume 15. Moreover the convexed upper and lower surfaces 110 and 112 withstand much greater pressure than the planar upper and lower surfaces of the float 52'. In this regard, it is contemplated that the float 52' can be substantially spherical. However, a sphere defining a sufficient volume 120 to produce the desired buoyancy requires a large reservoir volume 15 thereby necessitating an increase in the overall size of the drain valve. Therefore, in the preferred illustrated embodiment the float 52' includes the substantially verticle cylindrical sidewall which defines the surface 114. This allows requisite buoyancy to be produced in a relatively small reservoir volume, and any sacrifice in crush strength lost through the use of the vertical sidewall can be compensated for by providing an annular bracing member 126 which for extends between the sidewall portion of the shell 116 and the sleeve 118.

In light of the above it will be appreciated that the drain valve 10 automatically accumulates and ejects condensates and solid contaminants from air receiver tanks, airline drip legs, intercooler and aftercooler separators and various other pneumatic systems and devices. The drain valve 10 can utilize the existing line pressure of the associated pneumatic system to eject condensates without wasting valuable compressed air, and its operation is fully pneumatic such that no electricity is required and the valve is safe for use in flammable environments. The pilot valve 41 and other actuating controls are isolated from the reservoir 15, and the pressurized air actuating the pilot valve 41 is filtered through an air filter 39 (ideally 40 micron at 40), so as to reduce the possibility of valve failure and so as to reduce cleaning and maintenance.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An automatic drain valve for selectively discharging accumulations of condensables and foreign materials from a pneumatic system, said automatic drain valve comprising:

a reservoir defining a reservoir volume for collecting said condensables and foreign materials, said reservoir including a head portion and a base portion, said base portion being provided with a first passageway defining an inlet for being placed in fluid communication with said pneumatic system and defining a mouth opening into said reservoir volume whereby said condensables and foreign materials are communicated to said reservoir volume, said reservoir further including a drainage conduit defining an outlet to facilitate the discharge of said condensables and foreign materials from said reservoir volume, whereby said first passageway and said drainage conduit provide flow-through communication with said pneumatic system;

a pneumatic valve operator;

a pilot valve housing mounted within said reservoir volume of said reservoir, said pilot valve housing defining a cavity, said cavity being sealed against communication with said reservoir volume;

a pilot valve mounted within said cavity of said pilot valve housing, said pilot valve including a sensor tube, a valve seat at a first end of said sensor tube, and an axial moving magnetic valve plug of one polarity for selectively engaging said valve seat;

a buoyant float respondable to liquid in said reservoir volume, said float having a convexed upper surface and a convexed lower surface, said float being provided with a hole for slidably receiving said pilot valve housing, said float being movable within said reservoir volume from a lower position to an upper position, said hole of said float being substantially coaxially aligned with said mouth of said first passageway such that said float does not obstruct the flow of said condensables and foreign materials into said reservoir volume and such that said condensables and foreign materials do not disrupt the operation of said float;

an annular magnet mounted in said float proximate said pilot valve housing said annular magnet normally having a polarity opposite the polarity of said magnetic valve plug;

a drainage valve for said reservoir, said drainage valve having an inlet and an outlet, said inlet communicating with said outlet of said drainage conduit of said reservoir;

a linkage means for connecting said pneumatic valve operator to said drainage valve, whereby said pneumatic valve operator selectively opens and closes said drainage valve; and pneumatic means connected between said pilot valve and said valve operator whereby said valve operator quickly opens said drainage valve when said float reaches said upper position and quickly closes said drain valve when said float reaches said lower position, said pneumatic means comprising a first conduit connecting said cavity of said pilot valve housing in fluid communication with a source of filtered air and a second conduit connecting said sensor tube in fluid communication with said pneumatic valve operator.

2. The automatic drain valve of claim 1 wherein said float defines a substantially vertical exterior surface extending between said upper and lower convexed surfaces.

3. The automatic drain valve of claim 2 wherein said float includes an outer shell having an upper portion defining said upper convexed surface, a lower portion defining said lower convexed surface, and a substantially cylindrical sidewall defining said substantially vertical exterior surface, said float further including an inner sleeve extending between said upper portion of said shell and said lower portion of said shell so as to define said hole of said float, whereby said shell and said sleeve cooperatively define a fluid impervious float volume.

4. The automatic drain valve of claim 3 wherein said float includes a brace member extending between said sidewall of said shell and said inner sleeve for supporting said sidewall against pressure within said reservoir volume.

5. The automatic drain valve of claim 3 wherein said annular magnet is mounted within said float volume so as to engage and circumscribe said inner sleeve.

* * * * *